United States Patent [19]

Grieshaber

[11] Patent Number: 4,732,308

[45] Date of Patent: Mar. 22, 1988

[54] VETERINARY STAPLING IMPLEMENTS

[76] Inventor: Terry L. Grieshaber, 820 Ogeden Ave., Lisle, Ill. 60532

[21] Appl. No.: 15,783

[22] Filed: Feb. 17, 1987

[51] Int. Cl.[4] .............................................. A01B 17/00

[52] U.S. Cl. ...................................... 227/19; 227/155; 227/DIG. 1

[58] Field of Search ................. 227/19, 143, 144, 155, 227/DIG. 1

[56] References Cited

U.S. PATENT DOCUMENTS

| | | | |
|---|---|---|---|
| 580,556 | 4/1897 | Reinhold | 227/144 X |
| 1,911,036 | 5/1933 | Phenix | 227/155 |
| 2,180,484 | 11/1939 | Sims | 227/155 |
| 2,853,074 | 9/1958 | Olson | 227/DIG. 1 |
| 2,874,384 | 2/1959 | Krone | 227/143 X |
| 2,987,729 | 6/1961 | Taynton | 227/155 |
| 3,225,996 | 12/1965 | Mallina | 227/143 X |
| 3,598,299 | 8/1971 | Johnson | 227/144 |
| 3,604,561 | 9/1971 | Mallina et al. | 227/DIG. 1 |
| 3,744,495 | 7/1973 | Johnson | 128/337 |
| 3,873,016 | 3/1975 | Fishbein | 227/DIG. 1 |
| 4,399,810 | 8/1983 | Samuels et al. | 227/143 X |
| 4,402,445 | 9/1983 | Green | 227/19 |
| 4,493,322 | 1/1985 | Becht | 227/DIG. 1 |
| 4,513,746 | 4/1985 | Aranyl et al. | 128/334 |

*Primary Examiner*—Paul A. Bell

*Attorney, Agent, or Firm*—Aubrey L. Burgess; Henry S. Layton

[57] ABSTRACT

A veterinary stapling mechanism which comprises an implement having a staple delivery means and a staple crimping mechanism, the latter comprising a pantograph device for crimping the ends of a staple over a crimp plate which is then removed from the stapling location.

9 Claims, 9 Drawing Figures

FIG. 1
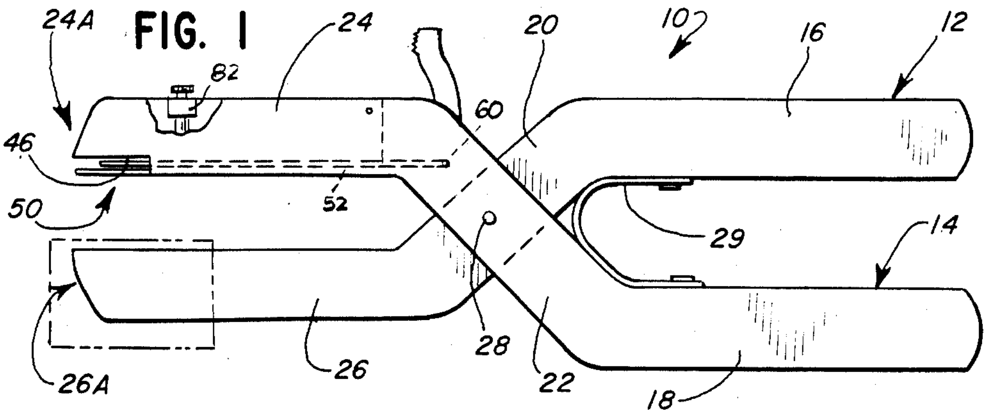
FIG. 2
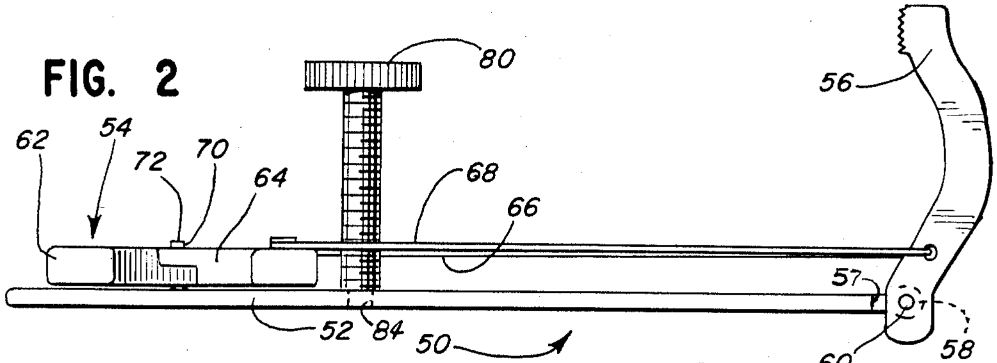
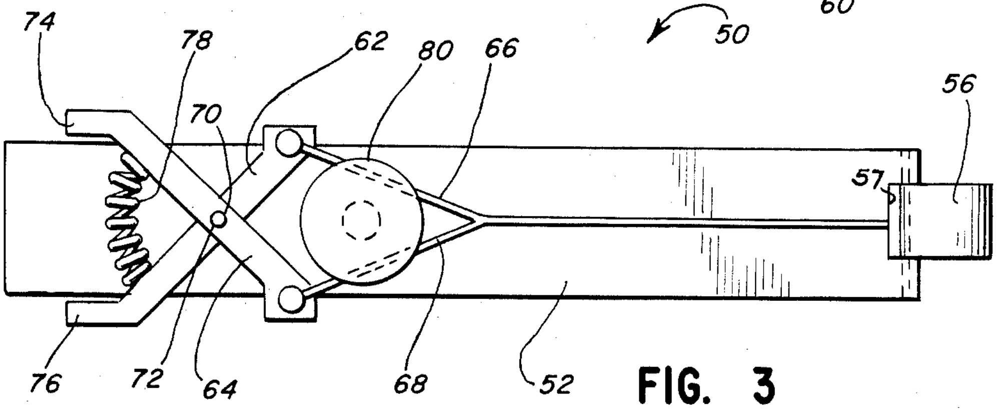
FIG. 3
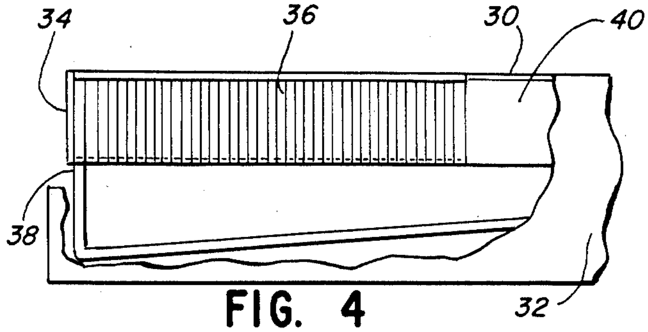
FIG. 4
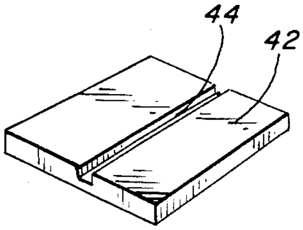
FIG. 4A

VETERINARY STAPLING IMPLEMENT

BACKGROUND OF THE INVENTION

1. Field of the Invention

This application relates to a hand held and operated stapling implement especially adapted for use in the treatment of pinnal disorders of animals.

2. Discussion of Prior Art

Phenix, U.S. Pat. No. 1,911,036, relates to the upholstery art and teaches the use of a pivoted lever having a flat face which engages a wire to bend the wire over material after the wire is inserted therethrough.

Sims, U.S. Pat. No, 2,180,484, teaches pedestal mounted apparatus for cutting off a length of wire, forming it into a staple, driving the staple through some material, and clinching the staple by means of movable jaw members operated by a cam and clutch mechanism.

Taynton, U.S. Pat. No, 2,987,729, teaches a stapling device which feeds components by air to a forming block, bending the staple leads by means of forming fingers, inserting the leads into a circuit board, and then clinching the leads by means of pressing fingers on brackets, the fingers being movable by cam and roller means.

Phenix, Sims and Taynton, supra, discussed above, do not relate to veterinary stapling devices, but to other, generally industrial types of stapling apparatus.

Johnson, U.S. Pat. Nos. 3,598,299 and 3,744,495, the latter being a continuation-in-part of the former, teaches a veterinary stapling tool which resembles a long-handled pliers. The tool comprises a two part stapling head, one part of which is constructed to hold a staple having an attached plate, and the other part of which is constructed to hold an apertured plate over which the prongs of the staple are bent; the apertured plate being held by a screw which, upon completion of the staple bending step, is unscrewed to release the plate.

Green, U.S. Pat. Nos. 4,402,445, and Aranyl et al, 4,513,746, relate to surgical fastener means, each disclosing apparatus for inserting a staple into a fastening means. The staples are formed with barb-like parts which interlock in the fastening means.

BRIEF DESCRIPTION OF THE INVENTION

The invention to be more fully described in this specification relates to a hand held and operated veterinary stapling implement having a form resembling a pliers, and which comprises a pair of implement members, each having an elongated handle portion adapted to be grasped by the hand, a pivot portion crossing over the other pivot portion, a pivot member, and an elongated stapling portion extending forwardly of said pivot portions and said elongated handle portions. Each stapling portion is open ended and comprises a stapling jaw, the stapling jaws being opposite to one another, so that upon movement of the handle portions toward one another, the jaw portions are likewise moved toward one another. One of the jaw portions receives a staple carrying mechanism, which can be, in one embodiment, a staple feeding mechanism similar to that used in conventional staplers wherein staples in strip form are fed to a position of use and ejected from the mechanism, or, in another embodiment, a transverse slot arranged to hold a staple for use. The other and opposite jaw portion carries a staple crimping device which comprises a pair of crimping anvils carried by the arms or legs of a pantograph assembly, the anvils being movable toward one another and into engagement with the legs of a staple by a hand operated pivotally mounted trigger mechanism connected to the arms or legs of the pantograph by cable means, or, alternatively, by rods and the like. The crimping device also comprises a generally flat plate which supports the pantograph and the trigger mechanism. The plate and its supported parts can be replaced and/or adjusted as necessary for varying staple lengths, and, also the staple carrying mechanism can be replaced with mechanism for holding different sized staples.

BRIEF DESCRIPTION OF THE DRAWINGS

FIG. 1 is a side elevational view of the veterinary stapling implement of this invention;

FIG. 2 is an enlarged side view of the staple crimping mechanism usable in the implement illustrated in FIG. 1;

FIG. 3 is a plan view of the crimping mechanism illustrated in FIG. 2;

FIG. 4 is an illustration, partly in section, of a typical staple carrying mechanism usable in the implement of FIG. 1;

FIG. 4A is a partial, isometric view illustrating an alternative construction of a staple carrying mechanism usable in the implement of FIG. 1.

DETAILED DESCRIPTION OF THE PREFERRED EMBODIMENTS

Figure 5:
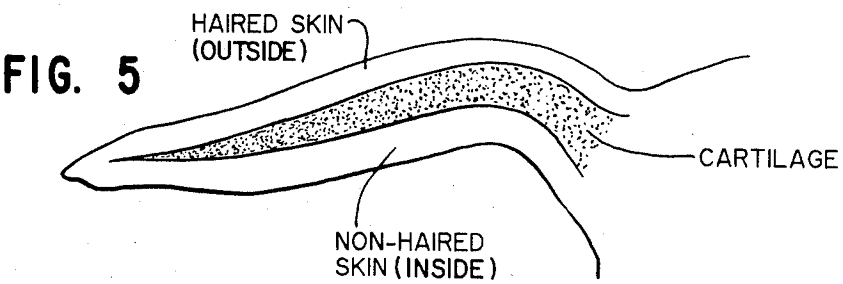
FIGS. 5, 6, 7 and 8 are illustrations with legends showing the cross-section of a normal animal ear, an animal ear with a hematoma, the ear after repair using the staple implement of this invention, and a view from below of the ear after repair.
Figure 6:
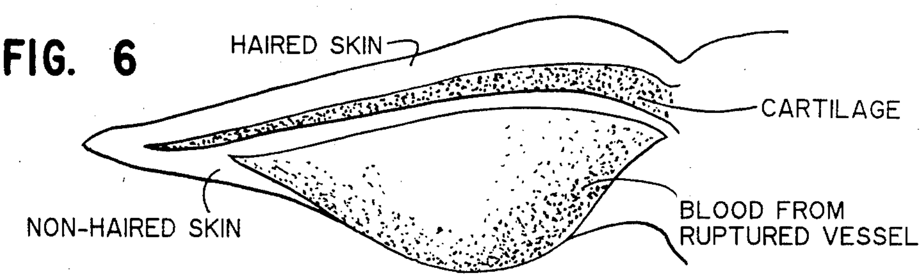
Figure 7:
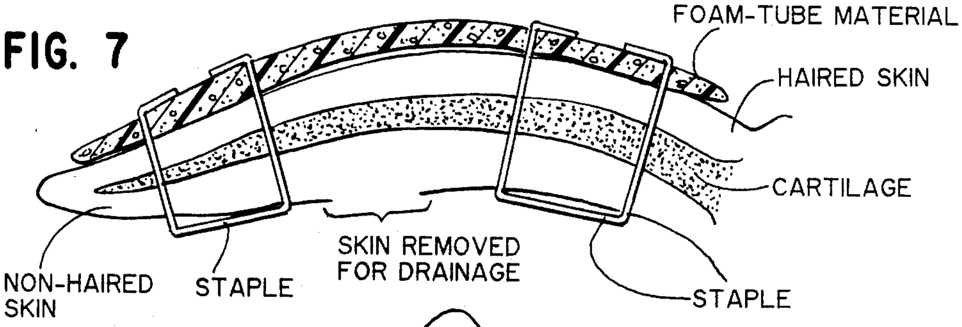
Figure 8:
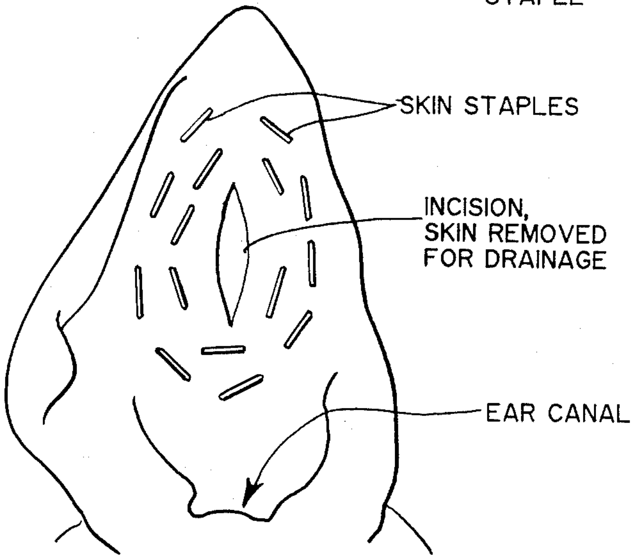

The invention herein described finds particular use in the treatment of pinnal disorders of animals. Normal animal ears, as illustrated in FIG. 5 comprise an inner cartilage covered with haired skin on the outside and non-haired skin on the inside. At times, a blood vessel will rupture on the inside of the ears and the blood will collect in a sack, see FIG. 6, which not only is irritating to the animal but causes the animal to scratch the ear and cause infection. To treat this condition, a portion of the non-haired skin is removed, opening the sack and permitting it to drain and heal. To protect the animal from further damage and discomfort, to promote healing, and to decrease scarring for a more cosmetic appearance, it is proposed to place a layer of a foam-type material, which is relatively soft and pliable, over the outside of the ear, and to fasten this material to the ear (see FIGS. 7 and 8). This is accomplished by using staples which pass through the ear and the foam-type material, the staples being inserted and crimped by using the stapling implement of this invention.

The stapling implement, generally identified with the reference character 10, comprises a pair of implement members 12 and 14, each having a handle portion 16 and 18, respectively, a pivot portion 20 and 22, respectively, and a forwardly extending stapling portion 24 and 26, respectively terminating in opposed stapling jaw portions 24A and 26A, respectively. The pivot portions are connected by a pivot member 28. The members 12 and 14 can be box-like in section with the pivot portions reduced in thickness such that the stapling portions 24 and 26 are opposed to one another. A spring 29, illustrated as a leaf spring in FIG. 1, provides a resilient force to return the jaw portions 24A and 26A to their illustrated positions after a stapling operation. A coil spring located between the handle portions 16 and 18 can be used in lieu of the leaf spring 29, if desired.

The stapling portion 26 houses a generally conventional staple delivery mechanism 30, (see FIG. 4), which comprises a staple receiving and holding guide 32 which terminates short of a guide end member 34, the distance between the guide member and the end member permitting the passage of a staple 36 when contacted by a plunger 38. Also there is a spring pressed feed member 40 urging the staples toward the end member 34. Resilient means, not shown, return the plunger 38 to a position for contacting the next succeeding staple. The box-like structure of the stapling portion 26 permits the insertion and removal of various sized staple delivery mechanisms depending upon the particular staple size desired.

As an alternative, the staple portion 26 of implement 10 can be formed as illustrated in FIG. 4A in which the portion 26 is provided with a means 42 including a transverse slot 44 to support a single staple. Using this modification entails the manual feeding of staples and is particularly useful when very large staples are necessary. The means 40 can be constructed to be inserted into and to be removed from the stapling portion 26 much in the same member as the mechanism 30.

The stapling portin 24 is open-ended and slotted as at 46 and receives a crimping mechanism 50 illustrated in detail in FIGS. 2 and 3. The crimping mechanism 50 comprises a crimp plate 52 formed to receive a pivot means at one end, as later described, a crimping pantograph 54, and a crimping trigger 56, the latter being received in a slot 57 int he plate 52 and pivoted at 58 by a pivot means 60 connected to the implement portion 22 which also serves as the pivot for the crimp plate 52 relative to the stapling portion 24, the pivot means 60 being, for example, threaded at one end to receive a nut and healed at the other end, so that assembly of the implement is enhanced. The crimping trigger 56 is connected to the arms 62 and 64 of the pantograph 54 by cable means 66 and 68 which can be united for at least a portion of their lengths if desired. The arms 62 and 64 of the pantograph 54 are pivoted at 70 by a pivot means 72 connected to the plate 52 and include crimping anvils 74 and 76 at their free ends. A compression spring 78 connected to the pantograph arms 62 and 64 forward of the pivot means 70 provides a resilient force to return the pantograph arms to their rest positions, as illustrated in FIG. 3, after a stapling operation. To crimp the ends of a staple, the trigger 56 is moved rearwardly, causing the anvils 74 and 76 to engage the ends of a staple and bend the ends over the crimp plate 52, after which the trigger is released, the pantograph returns to its rest position and the stapling implement can be moved laterally away from the animal. A set screw 80 screwed into a threaded nut 82 connected to the portion 24 of the implement and received in a threaded opening 84 in the plate is used to connect the crimping device or mechanism 50 to the staple portion 24 of the implement 10 and to provide an adjustment of the crimping device 50 relative to the staple delivery mechanism whereby the depth of the staple can be varied. This not only allows for varying the depth of the staples for various ear thicknesses and for use with various thicknesses of the foam-type material, but also permits the use of various thicknesses of staples as the swelling of the ears decreases.

In use, the stapling jaws are positioned over the area of use, the handle portions are squeezed together to feed a staple through the affected part, the trigger is pivoted rearwardly to crimp the staple, and the hand pressure is released to return the implement to the illustrated rest position, ready for another stapling operation.

The appended claims are intended to cover all reasonable equivalents, and are to be interpreted as broadly as the prior art will permit.

I claim:

1. A veterinary stapling implement for use with a two-pronged staple comprising:
   - a pair of implement members, each having an elongated handle portion, a pivot portion, and an elongated stapling portion extending forwardly of said pivot portion, each stapling portion having a jaw, said pivot portion of each member being contiguous with said handle and jaw portions thereof, and said jaw portions being opposed to one another;
   - a pivot member pivotally joining said pivot portions and thus said implement members;
   - a stapling means in one of said jaw portions comprising a staple feeding and driving means;
   - a staple crimping means opposite said staple feeding and driving means in the other jaw portion, said crimping means comprising a crimping plate and a pair of crimping anvils movable toward one another and positioned to each engage a prong of a driven staple and bend said prongs toward one another about said crimping plate; and
   - means to move said crimping anvils toward one another to bend and crimp said staple independently of any pivoting movement of said implement members.

2. A veterinary stapling implement as recited in claim 1, further comprising means connected to at least one implement member for supporting said crimping plate.

3. A veterinary stapling implement as recited in claim 1, further comprising a pantograph assembly supporting said anvils.

4. A veterinary stapling implement as recited in claim 3, in which said means to move said crimping anvils comprising a pivoted trigger whereby pivoting of said trigger produces axial movement of said anvils toward one another.

5. A veterinary stapling implement as recited in claim 4 in which said means comprises a cable means connecting said trigger and said assembly.

6. A veterinary stapling implement as recited in claim 5, in which said trigger is hand operated and said trigger is positioned to extend outwardly from said stapling portion.

7. A veterinary stapling implement as recited in claim 3, in which said jaw portions are open-ended for insertion and removal of said staple carrying means and said crimping means.

8. A veterinary stapling implement as recited in claim 1, in which said staple carrying means comprise a transverse slot in one of said jaws.

9. A veterinary stapling implement as recited in claim 1, in which said stapling means comprises a staple guide, a staple pushing element, and means resiliently urging said pushing element toward staples on said guide to thereby feed staples to a location for use.

* * * * *